Sept. 20, 1966 G. J. EDWARDS ET AL 3,273,673
DISC BRAKES
Filed Dec. 14, 1964 2 Sheets-Sheet 1
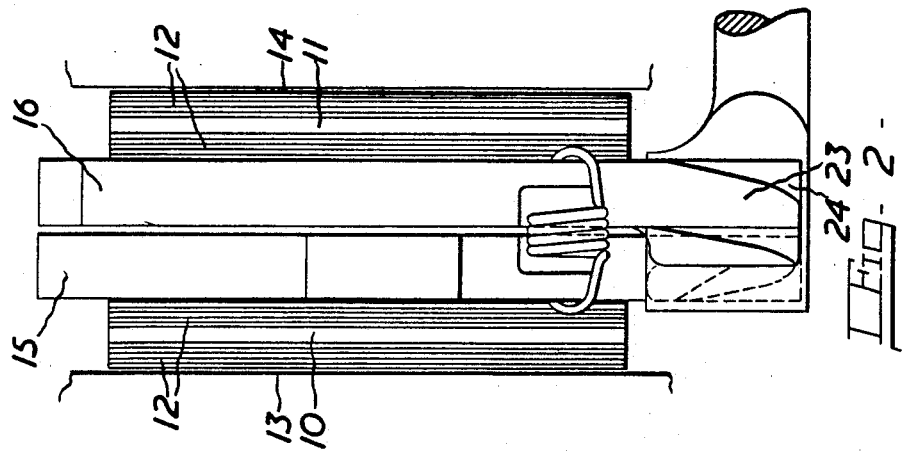
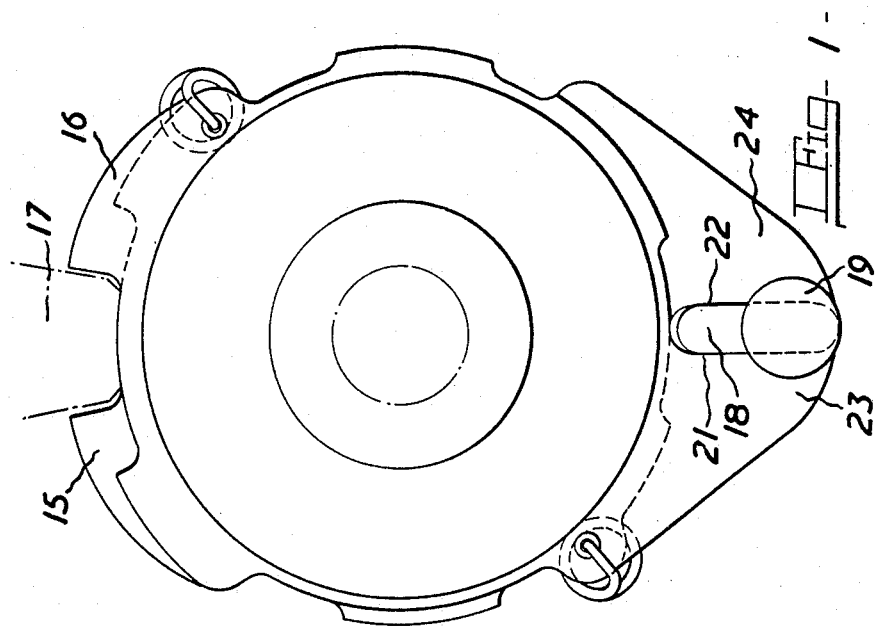
Alexander Senkowski, Deceased
By Barclays Bank Limited, Executor
Gordon John Edwards & George Eric Thompson
By Scrivener Parker Scrivener & Clarke

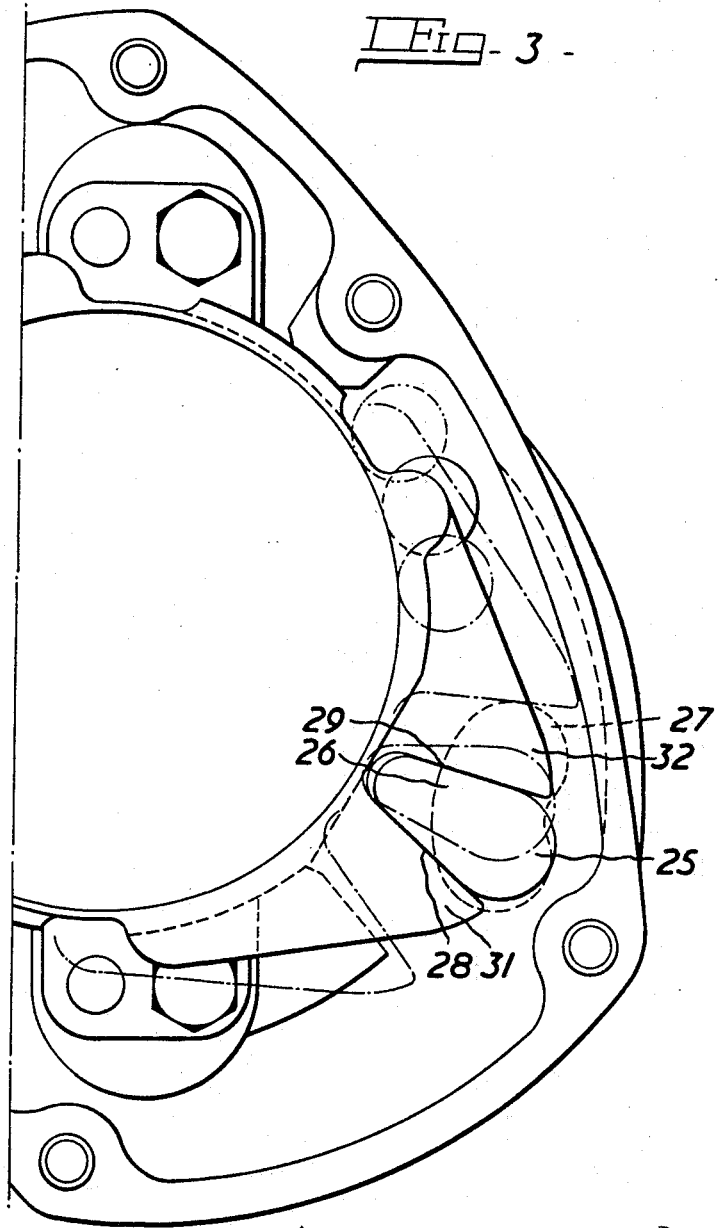

ered Sept. 20, 1966

United States Patent Office 3,273,673
Patented Sept. 20, 1966

3,273,673
DISC BRAKES
Gordon John Edwards, Solihull, and George Eric Thompson, Birmingham, England, and Alexander Senkowski, deceased, late of Warwickshire, England, by Barclays Bank Limited, executor, London, England, assignors to Girling Limited and Tractor Research Limited, both British companies of Birmingham, England, and Coventry, England, respectively
Filed Dec. 14, 1964, Ser. No. 418,347
4 Claims. (Cl. 188—72)

This invention relates to improvements in disc brakes of the self-energizing kind in which relatively stationary and rotatable surfaces are brought into frictional engagement by axial separation of two annular plates having between them balls or rollers engaged in opposed co-operating inclined recesses in the adjacent faces of the plates. The application of the brake is initiated by a small relative angular movement between the plates which causes the balls or roller to move them apart into engagement with the rotatable friction members. The plates then tend to be carried round with the rotatable members until an abutment on one plate engages a fixed stop and the continued angular movement of the other plate acting through the balls and ramps urges the plates apart to apply the brake.

According to one feature of our invention, in a disc brake of that kind the relative angular movement between the plates to initiate the application of the brake is effected by a cam located between projecting lugs on the plates and carried by a floating shaft so that the cam can follow the movements of the lugs as the friction surfaces wear and the angular movement of the plates increases, and the cam can also follow the movements of the lugs in reverse braking.

According to a further feature of our invention, the floating shaft carrying the cam is guided for movement in a path which is part of a spiral or is inclined with respect to a tangent of a circle concentric with the brake axis and passing through the axis of the shaft.

Two examples of brakes in accordance with our invention are illustrated in the accompanying drawings in which:

FIGURE 1 is an end view of the operative parts of one form of brake;

FIGURE 2 is a side elevation of FIGURE 1; and

FIGURE 3 is an end view similar to FIGURE 1 but showing an alternative arrangement of the means for initiating the application of the brake.

The brake illustrated in FIGURES 1 and 2 is in general of the well known type in which discs 10, 11 adapted to rotate with a shaft carrying rings or pads 12 of friction material and are separated to bring them into friction 1 engagement with braking surfaces 13, 14 on a stationary housing by co-operating pressure plates 15, 16 located between the discs.

Balls located in co-operating inclined recesses urge the plate apart on relative angular movement between the plates. The application of the brake is initiated by moving the plates angularly in opposite directions and they are then carried round with the discs until one plate engages a stop 17, the other plate continuing to move angularly to provide a servo action urging the discs into engagement with the braking surfaces 13, 14. In the usual brake of this kind the initial movement of the pressure plates 15, 16 is effected by toggle links connected to angularly spaced lugs on the plates and to a radial pull rod.

According to our invention, in the brake shown in FIGURES 1 and 2 the initial angular movement of the pressure plates to apply the brake is effected by a cam 18 on a shaft 19 which is free to move in a circumferential direction.

The cam has flat parallel sides and is located between complementary parallel abutment surfaces 21, 22 on lugs 23, 24 projecting from the respective pressure plates. The lugs 23, 24 are offset transversely as shown more particularly in FIGURE 2 to bring them substantially into the same plane.

The effective centre of the cam is offset inwardly from the axis of the shaft. As the shaft is free to move in a circumferential direction the cam can follow the movements of the lugs 23, 24 as the friction surfaces wear and the angular movement of the pressure plates increases and the cam can also follow the movements of the lugs in reverse braking.

When the shaft 19 is partially rotated in a clockwise direction the engagement of one lobe of the cam 18 with the abutment surface 22 is located at a considerable distance radially inwards from the axis of the shaft while the engagement of the other lobe with the lug 21 is located at a relatively small distance radially outwards from that axis.

The angular movement of the cam required to apply the brake increases as the friction surfaces wear, and the mean effective position of the points of engagement between the cam and the lugs moves radially outwards because the engagement between the cam and the lug 22 moves outwardly faster than the engagement between the cam and the lug 21 moves inwardly.

If the shaft 19 is guided in a path such that as the shaft moves circumferentially with the pressure plates in the normal direction of rotation of the discs the mean effective position of the points of engagement of the cam with the lugs on the pressure plates can be kept substantially constant.

Whether or not the effective centre of the cam is offset from the axis of the shaft there is a change in the effective radial position of the cam when the direction of rotation of the rotatable friction surfaces is reversed.

When the brake is applied after some wear of the friction members has taken place one plate is in contact with its abutment while the other has moved through an appreciable angle which may be of the order of 10° to 12°. On changing from forward to reverse braking the plates rotate through twice that angle into engagement with the other abutment which is equivalent to a similar angular movement of the cam with the plates stationary, and the cam tends to lock between the lugs on the plates.

One method of overcoming this difficulty is shown in FIGURE 3. In this arrangement the shaft 25 carrying the cam 26 is guided for movement in a path which is part of a spiral or is inclined with respect to a tangent of a circle concentric with the brake axis and passing through the axis of the camshaft. In the embodiment illustrated the camshaft is guided in a kidney-shaped slot 27 in a stationary member, the end of the slot which is farthest from an approaching point on one of the rotatable discs being radially inwards of the other end. Thus as the camshaft moves circumferentially with the pressure plates in the normal direction of rotation of the discs it also moves radially inwards and the mean effective position of the points of engagement of the cam with the lugs on the pressure plates is kept substantially constant.

The abutment surfaces 28, 29 on the lugs 31, 32 are preferably oppositely inclined as shown in FIGURE 3, the spacing between them increasing in a radially outwards direction and the cam 26 is of pear or similar cross-section, its side faces being oppositely inclined at substantially the same angle as the abutment surface 28, 29.

Where brakes incorporating identical pairs of pressure plates are located on opposite sides of a vehicle and where the projecting lugs are so arranged on the plates as to be not opposite each other, then on one side of the vehicle the plate furthest from the centre of the vehicle will have its lug below the cam, and the plate nearest the centre of the vehicle will have its lug above the cam.

On the opposite side of the vehicle the plate nearest the centre of the vehicle will have its lug below the cam, and the plate furthest from the centre of the vehicle will have its lug above the cam.

The floating shaft previously described may be arranged to rotate on a fixed point close to the centre of the vehicle.

When, on changing from forward to reverse braking, the plates rotate, the cams will tilt away from a perpendicular to the plates.

This will cause an additional relative rotation of one or other set of plates dependent upon the direction of tilt. By having differently inclined guide slots it is possible to make allowance for this additional rotation, thus maintaining balanced braking.

The inclined and curved guide can also be employed with a rod and cam actuator, the cam being of the usual S type engaging directly with the lugs or of the strut type in which tappets or struts are disposed between the cam and the guided member.

We claim:

1. A disc brake comprising a stationary housing, a rotatable shaft extending axially through said housing, axially spaced friction surfaces in said housing, friction members axially movable on and rotatable with said shaft, co-operating pressure plates located between said friction members, opposed co-operating inclined recesses in the adjacent faces of said pressure plates, roller means in said recesses, radially projecting lugs on said pressure plates, opposed abutment surfaces on said lugs, a cam located between said lugs for engagement with said abutment surfaces to effect relative angular movement of said pressure plates in opposite directions, a camshaft rotatable about its axis and carrying said cam, and means for guiding said shaft in said housing in a path such that as the shaft moves circumferentially with the pressure plates in the normal direction of rotation of said friction members it also moves radially inwards whereby the mean effective position of the points of engagement of the cam with the said abutment surfaces on the pressure plates remains substantially constant.

2. A disc brake as in claim 1 wherein said abutment surfaces on the lugs are oppositely inclined, the spacing between them increasing in a radially outwards direction and the cam is of pear or similar cross-section, the sides of the cam being oppositely inclined at substantially the same angle as the abutment surfaces on the lugs.

3. A disc brake as in claim 2 wherein said cam shaft is guided for movement in a path which is part of a spiral or is inclined with respect to the tangent of a circle concentric with the brake axis and passing through the axis of the camshaft.

4. A disc brake as in claim 2 wherein the said camshaft is guided for movement in an inclined curved slot in said housing, the end of the slot which is farthest from an approaching point on a friction member in the normal direction of rotation being radially inwards of the other end.

References Cited by the Examiner

UNITED STATES PATENTS

| | | | |
|---|---|---|---|
| 2,831,552 | 4/1958 | Kershner | 188—72 |
| 3,203,507 | 8/1965 | Bond | 188—72 |
| 3,204,727 | 9/1965 | Wilson et al. | 188—72 |

MILTON BUCHLER, *Primary Examiner.*

G. E. A. HALVOSA, *Assistant Examiner.*